June 28, 1960  B. B. FELTS  2,942,913
SAFETY CURTAIN FOR AUTOMOTIVE VEHICLES
Filed June 16, 1959  2 Sheets-Sheet 1
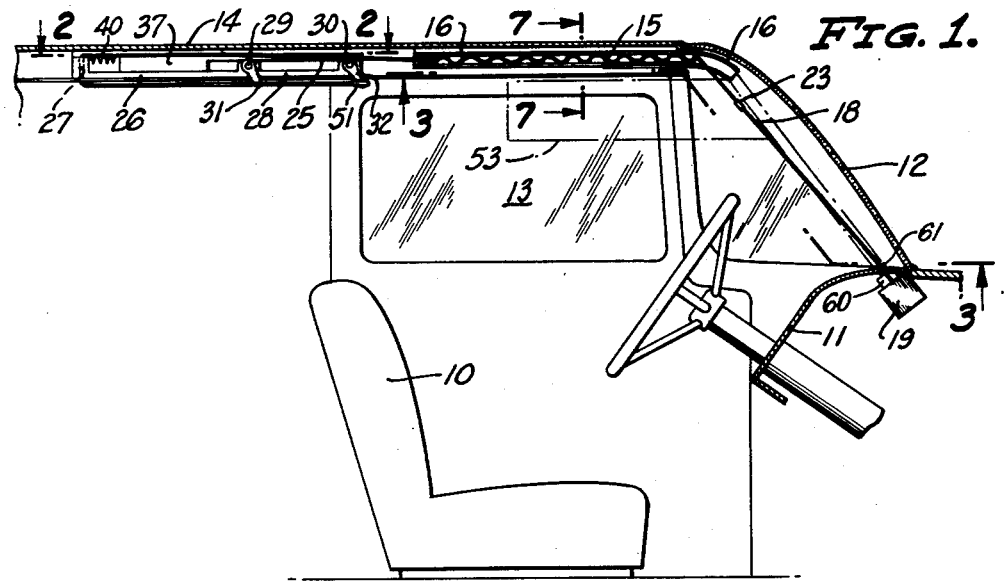
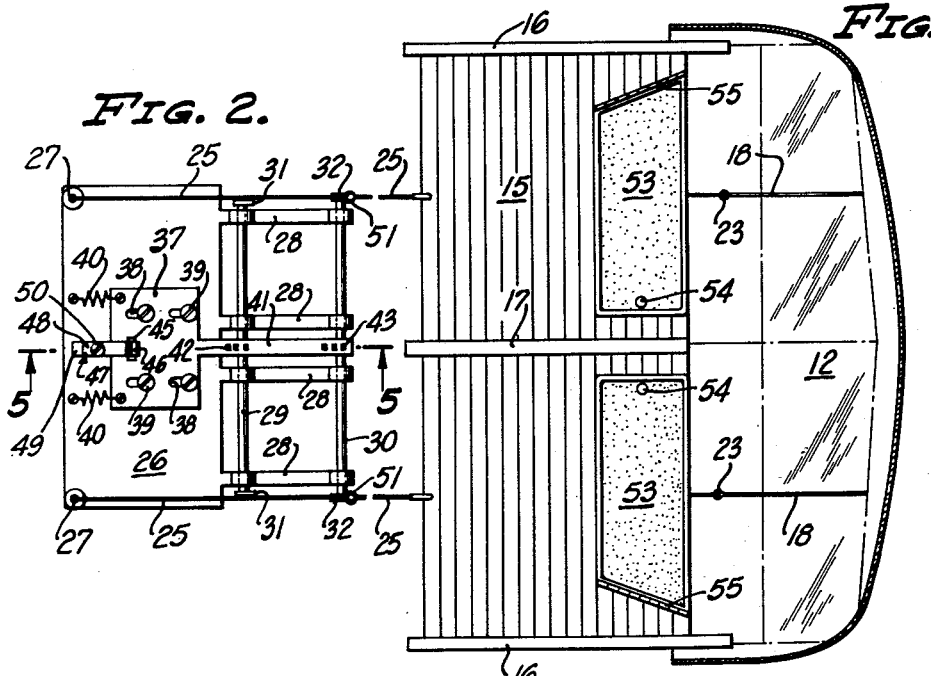
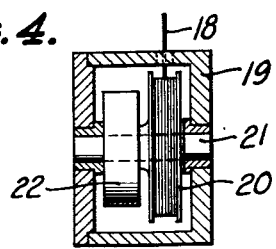
INVENTOR.
BASIL B. FELTS
BY Robert C. Comfort
ATTORNEY June 28, 1960    B. B. FELTS    2,942,913
SAFETY CURTAIN FOR AUTOMOTIVE VEHICLES
Filed June 16, 1959    2 Sheets-Sheet 2

INVENTOR.
BASIL B. FELTS
BY Robert C. Comstock
ATTORNEY

United States Patent Office 2,942,913
Patented June 28, 1960

2,942,913

SAFETY CURTAIN FOR AUTOMOTIVE VEHICLES

Basil B. Felts, 54 W. Ramsey St., Banning, Calif.

Filed June 16, 1959, Ser. No. 820,623

11 Claims. (Cl. 296—84)

This invention relates to a safety curtain for automotive vehicles.

It is now well recognized that a considerable number of serious injuries in accidents of automotive vehicles result from the body of the driver or the other front seat passenger being thrown into contact with the windshield or head liner of the vehicle when an accident occurs.

It is accordingly the principal object of my invention to provide a safety curtain for automotive vehicles which is normally disposed beneath the roof of the vehicle above the heads of the front seat passengers. A sudden impact or stop of the vehicle will disengage the curtain so that it moves forwardly and downwardly into a position in which it provides a shield between the front seat passengers and the windshield and head liner of the vehicle.

It is a further object of my invention to provide such a device which is also capable of being moved to a partially downward position in which it provides a sun shield for the vehicle, but will still automatically move to a protective position if an accident occurs.

It is a further object of my invention to provide such a device which is capable of being re-set and re-used and in which the device is adjustable as to the amount of impact required to release the curtain.

Another object of my invention is to provide related means whereby the movement of the curtain into its protective position will also automatically cut off the ignition of the vehicle in order to lessen the likelihood of fire or explosion.

It is also among the objects of my invention to provide a device of the class described which is simpler and more efficient in its construction and operation than previous devices intended for the same general purpose.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a longitudinal sectional view of my device in use on an automotive vehicle, with the forward positions of the safety curtain and sun visor indicated in phantom lines;

Fig. 2 is a top plan view taken on line 2—2 of Fig. 1;

Fig. 3 is a bottom plan view taken on line 3—3 of Fig. 1;

Fig. 4 is a sectional view of the box containing the spring and reel, which are shown in elevation;

Figure 5:
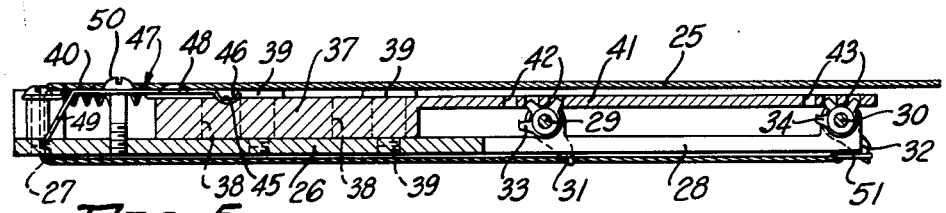
Fig. 5 is a sectional view taken on line 5—5 of Fig. 2, showing the device in retracted position.

A preferred embodiment which has been selected to illustrate my invention is adapted for use on an automotive vehicle having a front seat 10, a dashboard 11, a front glass windshield 12, a pair of glass side windows 13 and a roof 14.

My device comprises a safety curtain 15, which is slidably mounted in a pair of end tracks 16 and a center guide track 17. The safety curtain 15 may be formed of any suitable material which is capable of being moved at an angle in the manner shown and described herein. The tracks 16 and 17 extend longitudinally and are secured to the side of the roof 14 of the vehicle, above the front seat 10 and directly adjacent to the windshield 12. The end tracks 16 are straight for most of their length, but their forward ends are curved downwardly as shown in the upper right hand corner of Fig. 1 of the drawings.

A pair of cords 18 are attached at one end to the forward edge of the safety curtain 15, preferably midway between the center guide track 17 and the end tracks 16. The opposite ends of the cords 18 extend through openings in a pair of identically formed boxes 19, which are mounted directly beneath the dashboard 11, adjacent the bottom of the windshield 12. Each of the cords 18 is wound on a reel 20, which is mounted within the box 19 on a shaft 21.

Also mounted on the shaft 21 of each box 19 is a band spring 22, which is wound in such a manner that it normally tends to rotate the shaft 21 in a direction which will wind the cord 18 on the reel 20 and thus draw the forward end of the safety curtain 15 into a position adjacent to the boxes 19. The safety curtain 15 is so dimensioned that when in such position it substantially covers the windshield 12. Each of the cords 18 is provided with a ring 23, to permit detachment of the cords 18 from the safety curtain 15 in order to clean the windshield.

A second pair of cords 25 are attached at one end to the rear edge of the safety curtain 15 midway between the center guide track 17 and the end tracks 16. A plate 26 is secured to the roof 14 behind the safety curtain 15 and is provided with a pair of openings 27 at its rear corners, through which the cords 25 extend.

The plate 26 is provided with four forwardly directed arms 28, which provide bearings for a pair of rotatably mounted transversely directed rods 29 and 30. The mid-portions of the rods 29 and 30 carry upwardly directed segmental gears 33 and 34. The opposite ends of the rods 29 and 30 carry a pair of trip levers 31 and 32, which are adapted to removably receive loops 51 formed at the opposite ends of the cords 25.

A substantially rectangular heavy weight 37 is mounted for sliding movement above the plate 26. The weight 37 should have sufficient mass so that it will continue to move forwardly upon impact of the vehicle or upon a sudden stop. The weight 37 is provided with four elongated longitudinally directed slots 38, through which extend the shanks of four fastening members 39, the ends of which are screw threadedly mounted in the plate 26.

A pair of coil springs 40 are secured at their forward ends to the rear edge of the weight 37 and at their rear ends to the plate 26, adjacent the rear edge thereof. The coil springs 40 exert tension on the weight 37, normally tending to hold it in a retracted position in which the shanks of the fastening members 39 are disposed at the forward ends of the slots 38.

The weight 37 is provided with a forwardly directed elongated tongue 41, which is provided with two sets of spaced openings 42 and 43 respectively. The openings 42 and 43 are disposed directly above and are adapted to receive the teeth of the gears 33 and 34.

The top of the weight 37 is provided with an arcuate recess 45, which is adapted to removably receive the complementarily shaped forward end 46 of an elongated spring latch 47. The latch 47 is provided with a longitudinally directed straight portion 48 and a downwardly angled rear portion 49, the lower end of which extends into a notch in the plate 26. An adjusting screw 50 extends through the straight portion 48, with the bottom of its head bearing against the latch 47 and its lower end being screw threadedly mounted on the plate 26. The adjusting screw 50 can be tightened or loosened to adjust the amount of downward tension on the latch 47 and thus adjust the amount of force which must be exerted by the weight 37 in order to unseat the forward end 46 from the recess 45 and permit forward movement of the weight 37.

A pair of sun visors 53 are secured to the bottom of the safety curtain 15 adjacent its forward edge. The sun visors 53 are normally held against the safety curtain 15 by snap fasteners 54 disposed adjacent their inner ends. The outer ends of the visors 53 are pivotally secured to the safety curtain 15 by angularly directed hinges 55.

Figure 8:
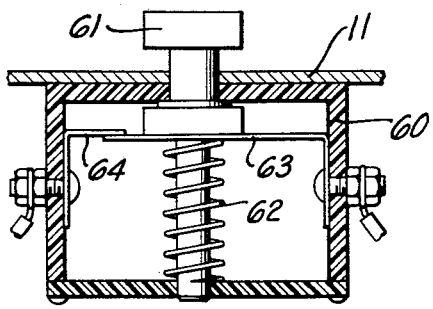
Fig. 8 is a sectional view of the box containing the ignition cut-off device, which is shown in elevation.

An ignition cut-off device as shown in Fig. 8 of the drawings may be provided in a box 60 mounted beneath the dashboard 11 in such position that a plunger 61 which protrudes above the top of the box 60 will be depressed by the forward edge of the safety curtain 15 as it moves into its protective position. The plunger 61 is normally held in upward position by a coil spring 62. Downward movement of the plunger 61 causes the downward flexing movement of an elongated spring arm 63, causing its end to break contact with the end of a shorter spring arm 64. The spring arms 63 and 64 are connected to the opposite sides of the ignition circuit of the vehicle.

In use, the safety curtain 15 is normally disposed in the position shown in full lines in the drawings. In such position, the coil springs 40 and a latch spring 47 hold the weight 37 in retracted position, with the shanks of the fastening members 39 being disposed at the forward ends of the slots 38. The segmental gears 33 and 34 have their teeth disposed in the forward openings 42 and 43, holding the trip levers 31 and 32 in forward position. The loops 51 at the ends of the cords 25 are disposed around the forward trip levers 32 and the parts are disposed in the positions shown in Fig. 5 of the drawings.

Figure 6:
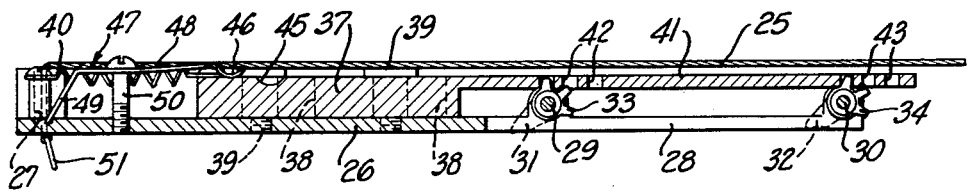
Fig. 6 is a similar view showing the device in its forward or protective position.
Figure 7:
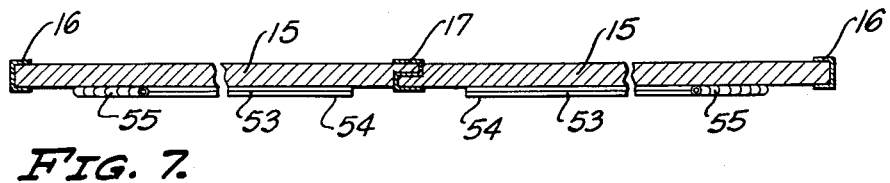
Fig. 7 is a sectional view taken on line 7—7 of Fig. 1.

If the vehicle stops suddenly, the weight 37 has sufficient momentum so that it continues to move in a forward direction. If the impact is strong enough, the weight 37 will move forward against the restraining effect of the coil springs 40 and the latch spring 47. As the weight 37 moves forwardly with respect to the plate 26, the forward end 46 of the latch spring 47 becomes unseated from the recess 45. The forward movement of the weight 37 moves the tongue 41 forwardly, causing the segmental gears 33 and 34 to rotate in a clockwise direction as shown in Figs. 5 and 6 of the drawings. The rotation of the gears 33 and 34 causes the rods 29 and 30 to rotate and pivot the trip levers 31 and 32 so that they move rearwardly. The rearward movement of the trip levers 31 and 32 permits the loops 51 at the ends of the cords 25 to slip off the ends of the trip levers 32. The parts are then disposed in the positions shown in Fig. 6 of the drawings.

The band springs 22 rotate the shafts 21 and reels 20 to retract the cords 18 into the boxes 19 and pull the safety curtain 15 into protective position between the occupants of the front seat 10 and the windshield 12. The forward edge of the safety curtain 15 engages and depresses the plunger 61 to separate the spring arms 63 and 64 and open the ignition circuit of the vehicle to prevent a fire or explosion.

When the vehicle stops, the coil springs 40 draw the weight 37 and tongue 41 back into their retracted position, rotating the gears 33 and 34 to move the trip levers 31 and 32 back into their normal positions.

The loops 51 will not pass through the openings 27 and the safety curtain 15 is retracted to its normal position by the driver reaching up and pulling the loops 51 forwardly and slipping them back over the trip levers 32.

The safety curtain 15 may also be disposed in a partly forward position in which it acts as a sun shield. This is accomplished by slipping the loops 51 over the trip levers 31 instead of the trip levers 32. This permits the safety curtain 15 to move into a position wherein it covers only the upper portion of the windshield 12. In such position, the sun visors 53 can be pivoted to a position overlying the upper portions of the side windows 13. The device will still operate in the manner described above in the event of an accident.

I claim:
1. A safety curtain construction for the interior of an automotive vehicle, comprising a pair of longitudinally extending end tracks secured to the roof of the vehicle adjacent to the windshield, a substantially rectangular safety curtain having its side edges slidably mounted in said tracks, a pair of cords secured at their upper ends to the front edge of said safety curtain, a pair of reels mounted beneath the windshield, the lower ends of said cords being wound on said reels, each of said reels being mounted on a shaft, a band spring mounted on each of said shafts, said band springs normally urging said shafts into rotation in a direction whereby said cords are wound upon said reels, a plate secured to the roof of the vehicle behind said tracks, a transversely directed rod rotatably mounted on said plate, the midportion of said rod having an upwardly directed segmental gear, said rod having a trip lever at each end thereof, a second pair of cords attached at one end thereof to the rear edge of said safety curtain, said second pair of cords extending rearwardly and then being looped back through the rear of said plate to extend forwardly, each of said cords having a loop at its opposite end, said loops being removably fitted around said trip levers, said trip levers adapted to be pivoted upon rotation of said rod to release said loops, a weight disposed adjacent to said plate, said weight being mounted for longitudinal sliding movement with respect to said plate, a forwardly directed tongue carried by said weight, said tongue having a row of openings disposed in cooperative relationship to the teeth of said segmental gear, means normally maintaining said weight in retracted position with respect to said plate, said weight adapted upon impact of the vehicle to move forwardly to rotate said rod and release said second pair of cords, said band springs rotating said reels to retract said first pair of cords and move said safety curtain forwardly into a protective position adjacent the inside of the windshield.

2. The structure described in claim 1 and a second transversely directed rod rotatably mounted on said plate, said rod having a second pair of trip levers at the ends thereof and a second upwardly directed segmental gear adjacent its midportion, said tongue having a second row of openings disposed in cooperative relationship to the teeth of said second gear, said second rod being disposed rearwardly from said first-named rod, the loops at the ends of said second pair of cords being adapted to be removably fitted around said second trip levers whereby said safety curtain is disposed in a partly forward position overlying the upper portion of the windshield to provide a partial sun shield.

3. The structure described in claim 2 and a pair of sun visors normally disposed in overlying relationship to the bottom of said safety curtain, means for removably holding said sun visors adjacent to said safety curtain, one end of each of said sun visors being pivotally secured to said safety curtain, whereby said sun visors may be released and pivoted into positions overlying the upper portions of the side windows of the vehicle when said safety curtain is in a position overlying the upper portion of the windshield.

4. The structure described in claim 1, said weight having a plurality of longitudinally directed slots, a plurality of fastening members having their shanks extending through said slots and their ends secured to said plate, said slots acting to limit the movement of said weight with respect to said plate, and coil spring means attached at the forward end thereof to said weight and at the rear end thereof to said plate, said spring means acting to return said weight to its normal position after forward movement thereof.

5. The structure described in claim 1 and means for adjustably controlling the amount of impact required to cause forward movement of said weight, said means including a spring latch normally engaging said weight and an adjustable member for controlling the amount of tension holding said spring latch in engagement with said weight.

6. A safety curtain construction for the interior of an automotive vehicle, comprising track means secured to the roof of the vehicle adjacent to the windshield, a safety curtain slidably mounted in said track means, at least one cord secured at one end thereof to the front edge of safety curtain, at least one reel mounted beneath the windshield, the other end of said cord being wound on said reel, spring means normally urging said reel in a direction whereby said cord is wound on said reel, a transversely disposed rod adjacent the roof of the vehicle behind said curtain, said rod having a segmental gear, said rod having at least one trip lever, second cord means attached at one end thereof to the rear edge of said safety curtain, said second cord means having a loop at its opposite end, said loop being removably fitted around said trip lever, said trip lever adapted to be pivoted upon rotation of said rod to release said loop, a weight disposed adjacent said rod, said weight being mounted for longitudinal movement with respect to said rod, means carried by said weight engaging said gear whereby said rod is rotated upon forward movement of said weight, means normally maintaining said weight in retracted position, said weight adapted upon impact of the vehicle to move forwardly to rotate said rod and release said second cord means, said spring means rotating said reel to retract said first named cord and move said safety curtain forwardly into a protective position adjacent the inside of the windshield.

7. A safety curtain construction for the interior of an automotive vehicle comprising track means secured to the roof of the vehicle adjacent to the windshield, a safety curtain slidably mounted in said track means, cord means secured at one end thereof to said safety curtain, spring means normally tending to retract the other end of said cord means to move said curtain forwardly into a protective position adjacent the inside of the windshield, a transversely directed rod disposed adjacent the roof of the vehicle behind said curtain, second cord means attached at one end thereof to said safety curtain, the opposite end of said second cord means being removably secured to said rod, a weight disposed adjacent to said rod, said weight being mounted for longitudinal movement, means carried by said weight whereby said rod is rotated upon forward movement of said weight, means normally maintaining said weight in retracted position, said weight adapted upon impact of the vehicle to move forwardly to rotate said rod and release said second cord means, said spring means retracting said first-named cord means to move said safety curtain into said protective position.

8. A safety curtain construction for the interior of an automotive vehicle comprising track means secured to the roof of the vehicle adjacent to the windshield, a safety curtain slidably mounted in said track means, spring means normally tending to move said curtain forwardly into a protective position adjacent the inside of the windshield, a rod disposed adjacent the roof of the vehicle, means removably securing said curtain to said rod, a weight disposed adjacent to said rod, said weight being mounted for longitudinal movement, gear means directly connecting said weight and rod whereby said rod is rotated upon forward movement of said weight, means normally maintaining said weight in retracted position, said weight adapted upon impact of the vehicle to move forwardly to rotate said rod and release said curtain, said spring means moving said curtain into said protective position.

9. A safety curtain construction for the interior of an automotive vehicle comprising track means secured to the roof of the vehicle adjacent to the windshield, a safety curtain slidably mounted in said track means, spring means normally tending to move said curtain forwardly into a protective position adjacent the inside of the windshield, a rod disposed adjacent the roof of the vehicle behind said curtain, cord means attached at one end thereof to said safety curtain, the opposite end of said cord means being removably secured to said rod, a weight disposed adjacent to said rod, said weight being mounted for longitudinal movement, gear means directly connecting said weight and rod whereby said rod is rotated upon forward movement of said weight, means normally maintaining said weight in retracted position, said weight adapted upon impact of the vehicle to move forwardly to rotate said rod and release said cord means, said spring means moving said safety curtain into said protective position.

10. The structure described in claim 8, and a second rod disposed adjacent to said first named rod, said second rod having means for removably securing said curtain to said second rod, gear means directly connecting said weight and second rod whereby said second rod is rotated upon forward movement of said weight, said second means being spaced rearwardly from said first named means so that said curtain when secured to said second means is disposed in a partly forward position overlying the upper portion of the windshield to provide a partial sun shield, said weight upon forward movement rotating said second rod to release said curtain.

11. The structure described in claim 10 and a sun visor normally disposed in overlying relationship to the bottom of said safety curtain, one end of said sun visor being pivotally secured to said safety curtain, said sun visor adapted to be pivoted into a position overlying the upper portion of the side window of the vehicle when said safety curtain is in a position overlying the upper portion of the windshield.

References Cited in the file of this patent

UNITED STATES PATENTS

| | | |
|---|---|---|
| 1,936,251 | McCullough | Nov. 21, 1933 |
| 2,050,141 | Wethington | Aug. 4, 1936 |
| 2,592,573 | Joncas | Apr. 15, 1952 |
| 2,854,281 | Cassin | Sept. 30, 1958 |